Figure 1:
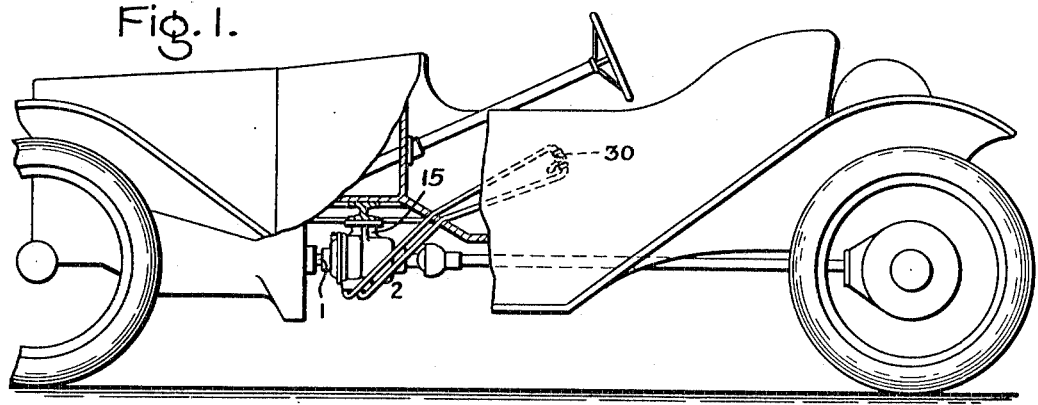

E. THOMSON.
HYDRAULIC CLUTCH MECHANISM.
APPLICATION FILED DEC. 10, 1913.

1,118,384.

Patented Nov. 24, 1914.

Witnesses:
Marcus L. Byng.
J. Ellis Glen.

Inventor,
Elihu Thomson,
by A. L. Smith Davis
Att'y.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

HYDRAULIC CLUTCH MECHANISM.

1,118,384.      Specification of Letters Patent.      Patented Nov. 24, 1914.

Application filed December 10, 1913. Serial No. 805,753.

*To all whom it may concern:*

Be it known that I, ELIHU THOMSON, a citizen of the United States, residing at Swampscott, county of Essex, State of Massachusetts, have invented certain new and useful Improvements in Hydraulic Clutch Mechanism, of which the following is a specification.

The present invention relates to a hydraulically controlled clutch mechanism.

One object of the invention is to provide such a mechanism which is self contained and compact, yet powerful.

A further object is to provide a hydraulic clutch mechanism which is controlled by merely opening and closing a valve, which valve may be situated wherever it is convenient to have it placed.

In carrying out my invention I provide a casing into which extend two shafts, a driving shaft and a driven shaft. These shafts carry complementary clutch members adapted to engage and disengage each other for coupling the driving shaft to and uncoupling the same from the driven shaft. Any desired or known form of clutch may be used. A multiple disk clutch, however, has certain advantages in connection with my invention and is very effective and I have, therefore, preferred to illustrate the invention as embodying such a clutch, the members of which engage and disengage by longitudinal movement relative to each other. Arranged inside the casing is a centrifugal pumping apparatus, the impeller of which is carried by the driving shaft. This pumping apparatus is primarily a pressure producing device and comprises a diaphragm dividing the casing and having suitable passages or ducts through which the impeller delivers fluid from a reservoir on the suction side of the pump to the delivery side. The delivery side of the pump communicates with a relatively small chamber or space which is connected to the reservoir by a suitable pipe forming a by-pass around the pump. This by-pass is controlled by a valve. With this valve closed, the pump sets up a circulation of fluid from the reservoir to the delivery chamber and builds up a considerable pressure therein, which pressure is directly utilized to force the clutch members into engagement. Preferably this operation takes place through the medium of a suitable piston. When this valve is open, however, the fluid from the delivery side of the pump is bypassed back to the reservoir and but a small pressure will then exist in the delivery chamber or space. From this it will be clear that the clutch will engage and disengage by merely closing and opening the valve. The pipes forming the by-pass may be made to extend to a point so that the valve may be within easy reach of the operator. The valve may be operated by hand or by the foot or any similar way. It might be opened by a pedal against a spring which would close it or the reverse, or in a similar manner it might be opened by hand closed manually and left partly opened or partly closed as desired. On the other hand, the valve may be located at a point distant from the operator or adjacent the clutch and operated through suitable mechanical or electrical connections. Such a clutch is applicable to any case of intermittent application of power from a moving motor or engine to do work. It has certain features, however, which, as will be pointed out more fully hereinafter, make it well adapted for use in connecting the engine of an automobile to the driving gear.

Figure 2:
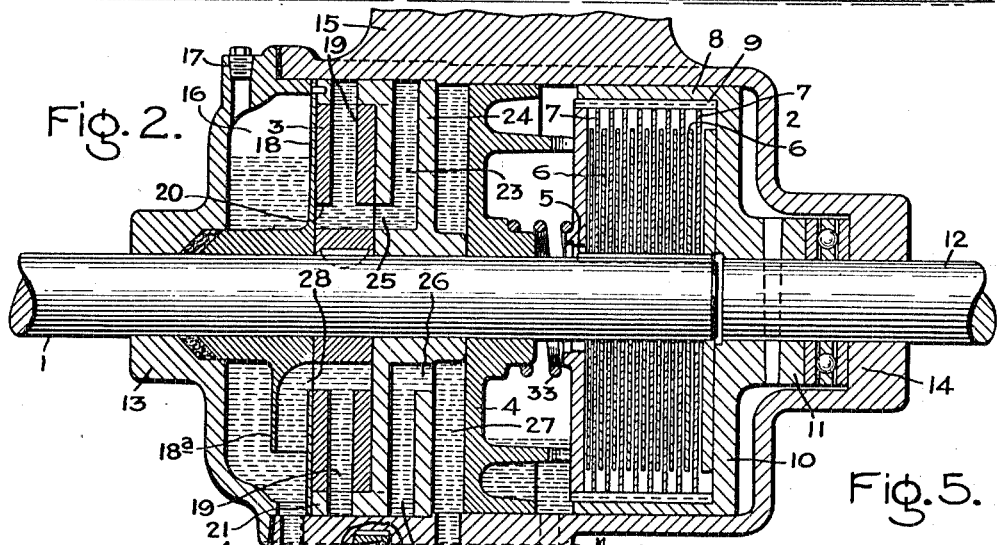
Figure 4:
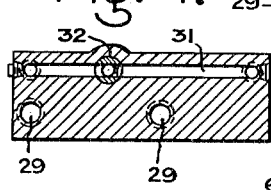
Figure 3:
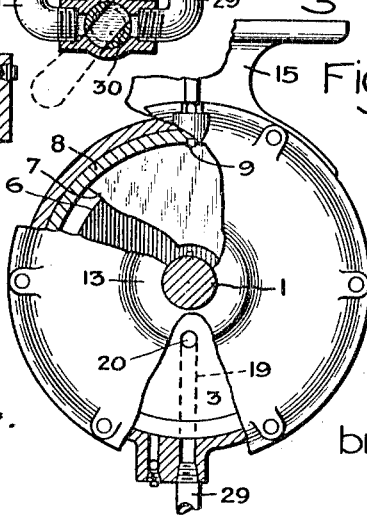
Figures 5, 6:
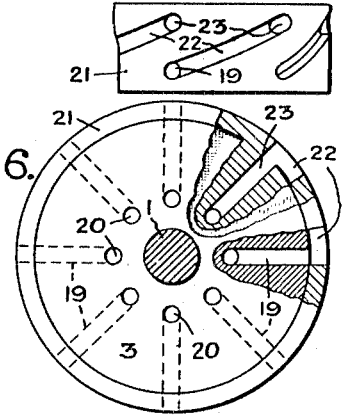

Referring to the drawing wherein I have illustrated a specific embodiment of my invention, Figure 1 shows in a general way the application of my clutch to an automobile drive; Fig. 2 is a section of the apparatus through a vertical plane of Fig. 3; Fig. 3 is an end view partly in section; Fig. 4 is a sectional view of a portion of Fig. 2 taken on the line 4—4; Fig. 5 illustrates a portion of the centrifugal pumping apparatus, and Fig. 6 the impeller with parts broken away to illustrate more clearly the relation of the impeller to the diaphragm.

Referring to Fig. 2, 1 is a shaft driven by a motor, engine or other power, which passes into the casing of a clutch device 2 and carries a centrifugal impeller 3. The driving shaft 1 is extended to pass loosely through the center of a piston 4 and carries keys 5 which drive a set of disks 6 forming one member of a multiple disk clutch, the other member of which is formed by the disks 7 keyed to the outer revolving member 8, which member is in the form of a short cylinder carrying keys 9 inside thereof and extending as a flange 10 down to a hub 11 on the shaft 12 which is to be driven. The casing 2 is practically oil-tight and extends around the whole apparatus having suitable bearings 13 and 14 for the two shafts. The casing is held stationary by being fixed to some support, as by part 15. At the left-hand end of the casing where the shaft 1 enters, is a fluid containing reservoir 16 provided with a suitable filling opening 17 through which the fluid, such as oil, preferably lubricating oil, may be introduced. On the right this reservoir or space is separated from the impeller 3 by a thin diaphragm 18.

The impeller is a steel disk having radial holes 19 bored into it down to a certain depth to intersect lateral holes 20 bored through from side to side near the center of said disk. The impeller revolves within the inner periphery of a ring 21 in which are formed oblique chambers or grooves 22 having one end in line with the radial holes 19 and the other end in line with radial holes 23 bored in the diaphragm 24. The radial holes 23 correspond in number to the holes 19 and, with the exception of one, communicate with axially extending openings 25 in line with and adapted to communicate with the lateral holes 20 of the impeller. The one radial hole 23, as shown in the lower half of Fig. 2, communicates through opening 26 with the delivery space or chamber 27. Fluid from the reservoir 16 is fed to the impeller through the single opening 28 formed in diaphragm 18. Within the reservoir 16 there is a sort of apron 18$^a$ depending from above the opening 28 to a point near the bottom of the reservoir. This forms a duct leading to the impeller from the lower portion of the reservoir so that the impeller will receive fluid even though the same be low in the reservoir.

Connecting the chamber or space 27 on the delivery side of the pump with the suction side is the by-pass pipe or conduit 29, the opening through which is controlled by a valve 30. This conduit may be made of such length as to bring the valve 30 to any desired location for operation either directly or indirectly. In Fig. 1 the same is shown as being arranged alongside the driver's seat of the automobile. The piston 4 may fit into the casing and slide freely, and in case any oil or fluid gets by the piston, it collects at the bottom of the casing and returns to the reservoir 16 by way of passages 31, as best shown in Fig. 4, in which passage is arranged a suitable check valve 32 to prevent it from flowing back from the reservoir. A light spring 33 is arranged between the clutch and the rear of the piston and tends to push the same back when the pressure is relieved.

The operation is as follows: Upon starting up the engine, motor, or other device connected to shaft 1, the shaft is turned thereby rotating the impeller 3. As the openings 20 of the impeller successively pass the opening 28 in diaphragm 18, they receive fluid from the reservoir 16 and deliver it to the communicating oblique chamber or groove 22. From this groove it is fed to the adjacent communicating radial hole 23 of the diaphragm 24 from which it passes to the next radial impeller hole 19 by way of communicating openings 25 and 20 to be again thrown out by the impeller to the next oblique chamber 22. This process is repeated around the entire periphery of the impeller, the fluid being finally delivered through opening 26 to the space or reservoir 27. The action of the fluid at this point will depend on the position of valve 30. If open, the fluid is by-passed from the space 27 back to the reservoir by pipe 29 and nothing further happens except to circulate a moderate quantity of oil. When the valve is closed, with the shaft 1 driving the impeller 3 at considerable speed, then the fluid taken up by the pump or impeller is finally delivered under considerable pressure between the duct bearing diaphragm 24 and the movable piston 4 and these are pushed apart. The piston, being movable, acts to close the disks of the movable disk clutch, one on the other, so as to tighten the clutch, and thus the power given to the shaft 1 by the motor or other device is made to turn the shaft 12. If less grip is required on the clutch than is so obtained, it is only necessary to open the by-pass valve 30 a little and allow a leakage. Should the valve 30 be closed and there be such a back strain upon the driving power through shaft 12 that the motive power communicated to part 1 is unable to overcome this strain, then the speed of the shafts 12 and 1 will fall, but the pressure developed by the revolving parts of the pump will also fall more rapidly than the speed under ordinary circumstances. In fact, the pressure developed is as the square of the speed, so that at some speed which can be set, the clutch will begin to slip and relieve the strain on the motive power, which strain in the case of a gasolene engine might cause it to stall. The slipping can be arranged to be at just that speed which the engine will maintain without stalling, with a little margin of safety. When, however, the back strain on the shaft 12 is relieved, the increased speed imparted at once sets the clutch into full action again without slip.

The centrifugal pump illustrated is in substance a multi-stage compressor, the several stages being angularly arranged as to each other around a single impeller. This type of pump is desirable where the speed is moderate and where a relatively light fluid as oil is used. The invention, however, is not limited to this specific type of centrifugal pump, as where the speed is high or where a heavy fluid, as mercury, is used, an ordinary centrifugal pump with a single stage, taking fluid near the center and delivering it to the periphery would be sufficient.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination of a driving member, a driven member, clutching mechanism for connecting said members, means for operating said clutching mechanism, and a centrifugal compressor having its impeller mounted on said driving member for operating said means.

2. The combination of a driving member, a driven member, clutching mechanism for connecting said members which becomes effective upon the relative movement thereof, a piston for effecting said relative movement, and a centrifugal compressor having its impeller mounted on said driving member for operating said piston.

3. The combination of a driving member, a driven member, clutching mechanism for connecting said members, pressure operated means for causing said clutching mechanism to become effective, a centrifugal compressor having its impeller mounted on said driving member for building up a pressure for operating said pressure operated means, a by-pass around said compressor, and a controlling valve in said by-pass.

4. The combination of a casing, a driving member and a driven member extending into the casing, clutching mechanism for connecting said members, pressure operated means mounted in said casing for causing said clutching mechanism to become effective, a reservoir in the casing, and a centrifugal compressor mounted in said casing and having its impeller mounted on the driving member for delivering fluid under pressure from said reservoir to said pressure operated means.

5. The combination of a casing, a driving member and a driven member extending into the casing, clutching mechanism for connecting said members, pressure operated means mounted in said casing for causing said clutching mechanism to become effective, a reservoir in the casing, a centrifugal compressor mounted in said casing and having its impeller mounted on the driving member for delivering fluid under pressure from said reservoir to said pressure operated means, a by-pass connecting the delivery side of said compressor to the reservoir, and a controlling valve in said by-pass.

6. The combination of a casing, a driving member and a driven member extending into the casing, clutching mechanism for connecting said members which becomes effective upon relative movement, a piston mounted in the casing for effecting such relative movement, a reservoir in the casing, a centrifugal compressor having its impeller mounted on said driving member for delivering fluid under pressure from said reservoir to said piston, a by-pass connecting the delivery side of the compressor to said reservoir, and a controlling valve in said by-pass.

7. The combination of a casing, a driving member and a driven member extending into said casing, clutching mechanism for connecting said members, pressure operated means for causing said clutching mechanism to become effective, a reservoir in said casing, a centrifugal compressor for delivering fluid under pressure from said reservoir to the pressure operated means and having an intake opening communicating with the reservoir adjacent its center, and an apron surrounding the opening and communicating with the reservoir at the lower side only.

In witness whereof, I have hereunto set my hand this fifth day of December, 1913.

ELIHU THOMSON.

Witnesses:
JOHN P. McMANUS, Jr.,
HENRY A. ANDERSEN.